(No Model.) 2 Sheets—Sheet 1.
W. H. MOORE.
ORE CONCENTRATOR.
No. 543,043. Patented July 23, 1895.
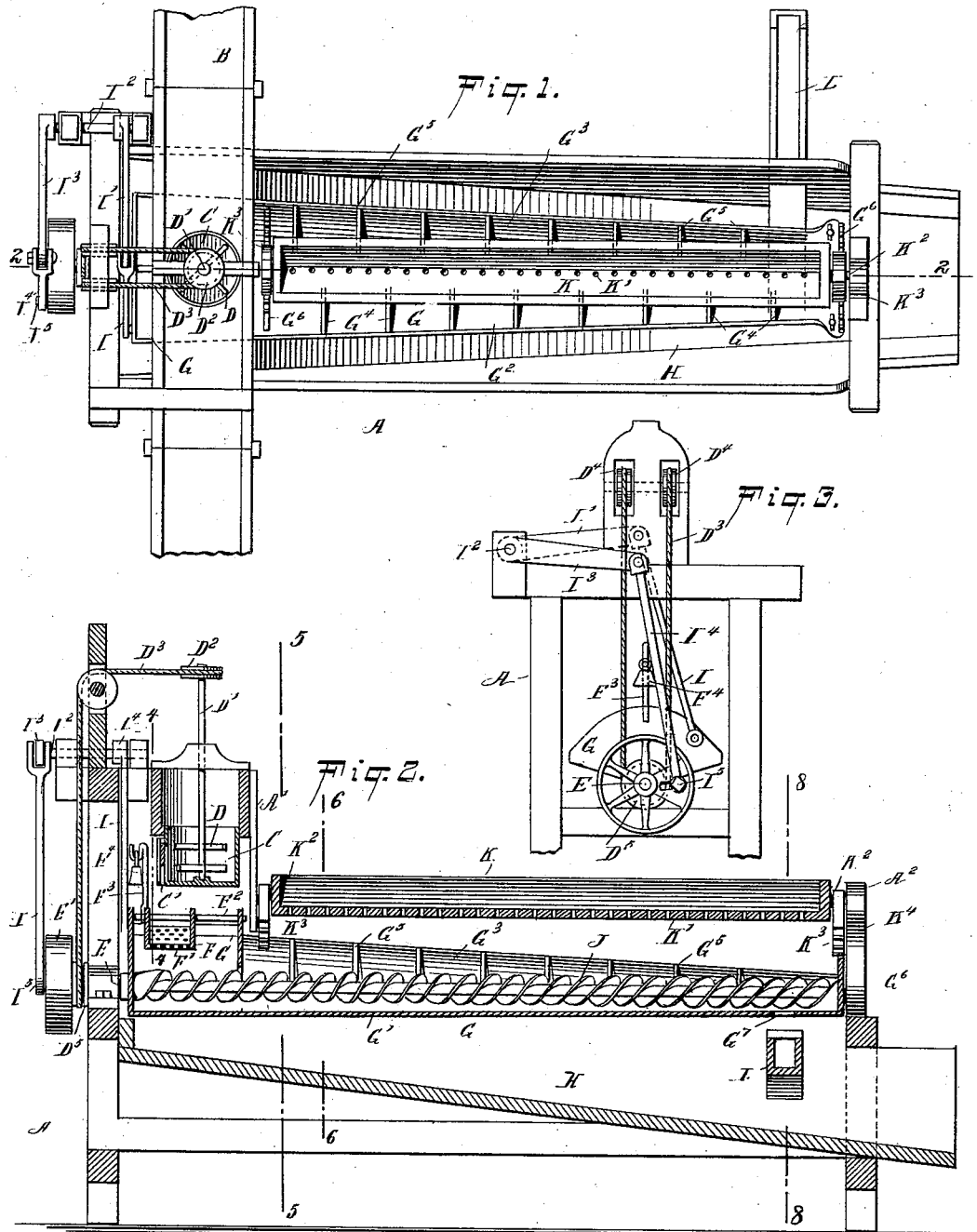
WITNESSES: 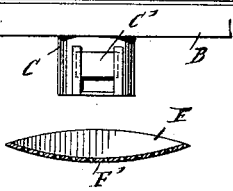 INVENTOR
William Gaebel. W. H. Moore
Theo. G. Hoster BY Munn & Co
ATTORNEYS.

(No Model.) 2 Sheets—Sheet 2.
W. H. MOORE.
ORE CONCENTRATOR.
No. 543,043. Patented July 23, 1895.
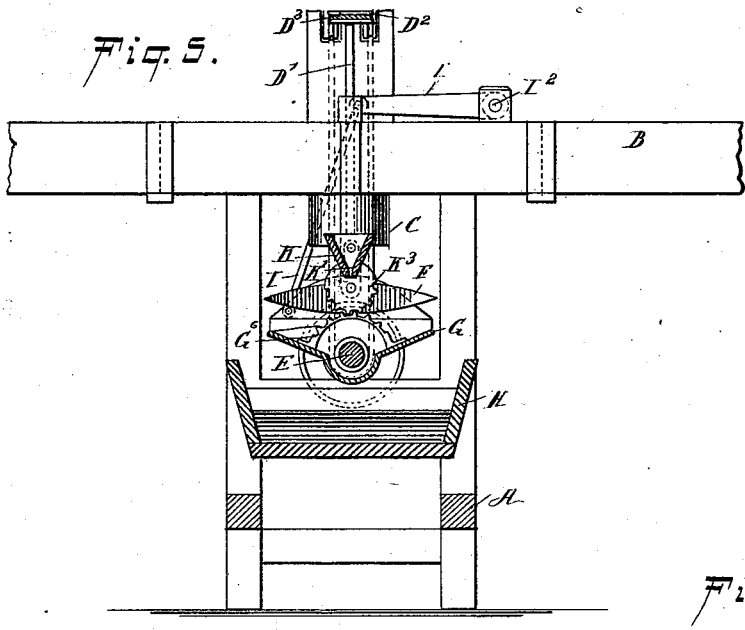
Fig. 5.
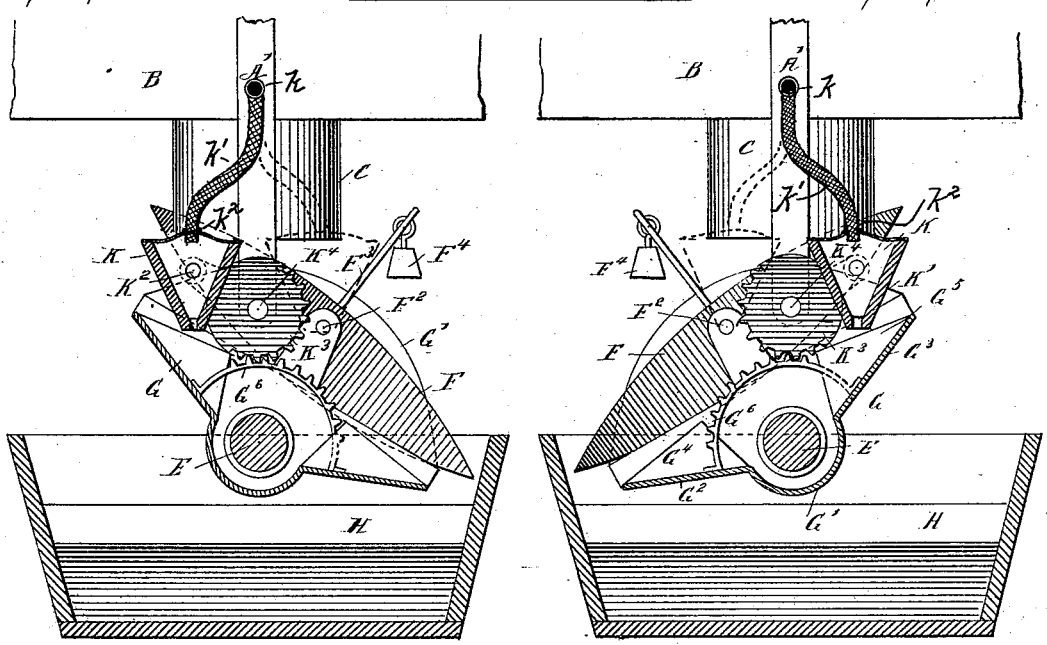
Fig. 6. Fig. 7.
Fig. 8.
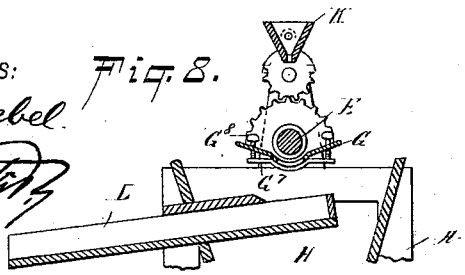
WITNESSES:
William Goebel
Theo. G. Hoster
INVENTOR
W. H. Moore
BY
Munn & Co
ATTORNEYS.

UNITED STATES PATENT OFFICE.

WILLIAM HENRY MOORE, OF DEADWOOD, SOUTH DAKOTA, ASSIGNOR OF ONE-HALF TO KITTIE KIDD, OF SAME PLACE.

ORE-CONCENTRATOR.

SPECIFICATION forming part of Letters Patent No. 543,043, dated July 23, 1895.

Application filed September 17, 1894. Serial No. 523,172. (No model.)

*To all whom it may concern:*

Be it known that I, WILLIAM HENRY MOORE, of Deadwood, in the county of Lawrence and State of South Dakota, have invented a new and Improved Ore-Concentrator, of which the following is a full, clear, and exact description.

The object of the invention is to provide a new and improved ore-concentrator which is simple and durable in construction and very effective in operation.

The invention consists of certain parts and details and combinations of the same, as will be fully described hereinafter, and then pointed out in the claims.

Reference is to be had to the accompanying drawings, forming a part of this specification, in which similar letters indicate corresponding parts in all the figures.

Figure 1 is a plain view of the improvement. Fig. 2 is a sectional side elevation of the same on the line 2 2 of Fig. 1. Fig. 3 is an end elevation of the same. Fig. 4 is a transverse section of the oscillating sieve and the feed-hopper, the section being taken on the line 4 4 of Fig. 2. Fig. 5 is a transverse section of the improvement on the line 5 5 of Fig. 2. Fig. 6 is an enlarged cross-section of the improvement on the line 6 6 of Fig. 2. Fig. 7 is a similar view of the same with parts in a different position, and Fig. 8 is a cross-section of the improvement on the line 8 8 of Fig. 2.

The improved ore-concentrator is provided with a suitably-constructed frame A, over which extends a flume B, connected with the stamp-mill or other machine for carrying the material down the flume to a feed-hopper C, secured in the bottom of the flume and into which the concentrates pass, the sand and dirty water passing along the flume to a creek or other convenient place of discharge.

The material falling into the feed-hopper C is agitated therein by a stirrer D, so as to move the material through a gate C' formed in one side of the hopper C, as is plainly shown in Fig. 4. The stirrer D is provided with arms extending radially from a vertically-disposed shaft D' (see Fig. 2) journaled in suitable bearings and provided at its upper end with a pulley $D^2$, over which passes a belt or rope $D^3$, passing over guide-pulleys $D^4$ to a driving-pulley $D^5$ secured on the main driving-shaft E, extending longitudinally and journaled in suitable bearings in the main frame A. This driving-shaft E carries a pulley E', connected by a belt with suitable machinery for imparting a rotary motion to the said shaft and consequently to the pulley $D^5$, so that a traveling motion is given to the belt or rope $D^3$ to rotate the shaft D', so as to actuate the stirrer and to cause a feeding of the material through the gate C'. The latter discharges upon a sieve F having an oscillating motion and adapted to receive a jar or bump in a manner hereinafter more fully described. The sieve F has a segmental perforated bottom F', as is plainly shown in Fig. 4, and is hung on a shaft $F^2$, journaled in the transverse heads $g$ forming part of a pan G hung loosely at its ends on the main driving-shaft E, the said pan receiving an oscillating motion from the main driving-shaft E, as hereinafter more fully described.

On one side of the sieve F extends radially to the shaft $F^2$ an arm $F^3$, carrying at its upper end a weight $F^4$, so that when the pan G is rocked to one side the arm $F^3$, after passing the center, causes a certain swinging motion of the sieve to force the latter, at one end, upon one side of the pan G to cause a jar or bump. Thus when the shaft $F^2$ is carried by the pan G to the right of the vertical plane of the axis of the shaft E the weight $F^4$ will cause the sieve F to swing suddenly into the position shown in Fig. 6, so that the right-hand side of the sieve will move in contact with the right-hand side of the pan G, and when the latter oscillates in the opposite direction then the other side of the sieve will strike the other side of the pan, as is plainly shown in Fig. 7. By this arrangement the concentrates will readily pass through the perforated bottom F' into the upper end of the pan G, while the sand and other tailings will be alternately discharged on opposite sides of the sieve F into an inclined sand-box H, extending longitudinally in the frame A under the pan G.

In order to impart an oscillating motion to the pan G, I connect the upper head pivotally with a link I hung on an arm I', secured on a rock-shaft $I^2$, journaled in suitable bearings in the upper portion of the frame A. On the shaft I² is secured a second arm I³, connected by a pitman I⁴ with a wrist-pin I⁵, secured on the driving-pulley E', so that when the shaft E is rotated a rocking motion will be imparted to the said pan G by the rock-shaft, arms, and link just mentioned.

The bottom G' of the pan G is made segmental, as is plainly shown in Figs. 6 and 7, and in this segmental portion operates a conveyer-screw J, secured to or forming part of the main driving-shaft E and extending through the pan, as previously explained. From the curved bottom G' extend outward and upward the wings or sides G² and G³, provided with transversely-extending partitions G⁴ and G⁵, respectively, placed suitable distances apart throughout the length of the wings, as is plainly indicated in Figs. 1 and 2.

Above the pan G is suspended a clear-water trough K, into which water is discharged from a pipe $k$ through the flexible tube $k'$, having its end held in a bracket $k^2$ secured to the trough K, the said trough being preferably made V-shaped in cross-section and formed in its bottom with perforations, so that the water is delivered in jets to the opposite sides or wings G² and G³ of the pan G. The trough K is provided at its ends with trunnions K² hung or journaled in segmental gear-wheels K³ journaled on brackets A' and A², forming part of the frame and the flume B, as is plainly shown in Fig. 2. The segmental gear-wheels K³ mesh in segmental gear-wheels G⁶ on the oscillating pan G, so that the motion of the latter is transmitted to the said segmental gear-wheels K³, whereby the latter impart a transverse swinging motion to the said water-trough K in such a manner that when the sieve F strikes one side of the pan G the trough K is on the opposite side of the pan, as will be readily understood by reference to Figs. 6 and 7.

In the lower end of the bottom G' of the pan G is arranged an outlet-opening G⁷ discharging into a transversely-extending delivery-chute L for carrying the concentrates to one side. The opening G⁷ may be increased or decreased by an adjustable plate G⁸ hung on thumb-screws G⁹, as indicated in Fig. 8.

The operation is as follows: The concentrates and fine sand gathering in the hopper C are discharged into the sieve F, as previously explained, and through the perforated bottom of the sieve pass the concentrates and very fine sand, while the coarser and lighter material is alternately discharged on opposite sides of the sieve into the sand-box H. The material passing through the sieve F into the upper end of the pan G is taken hold of by the conveyer J, to be moved toward the lower end, and by so doing the concentrates keep to the bottom G' of the pan, while the sand is raised by the action of the screw conveyer J and discharged alternately on the opposite sides or wings G² and G³ of the pan. The transverse partitions G⁴ and G⁵ on the said wings retard the downward motion of the pulp, thus preventing it from traveling too fast, it being understood that the pulp is alternately washed back upon the bottom G' to be again moved downward by the action of the screw conveyer J to the next lower partitions, and so on until it finally reaches the lower end of the pan. In order to cause the pulp to pass back into the bottom, the clear-water trough K swings to the raised side and discharges jets of water on the sand resting on the corresponding wing G² or G³ (see Figs. 6 and 7) to cause the pulp to be washed back into the bottom G'. Thus any concentrates that do come upon a wing of the pan are washed back by the water passing from the trough K to the corresponding wing. The concentrates as they finally pass into the lower end of the pan G drop through the opening G⁷ into the spout L, which carries the concentrates to one side of the machine to be treated further in the usual manner.

Having thus fully described my invention, I claim as new and desire to secure by Letters Patent—

1. An ore concentrator provided with a rocking pan having a curved bottom and side wings extending therefrom, each side wing being provided with transverse partitions, substantially as shown and described.

2. An ore concentrator provided with a rocking pan having a curved bottom and side wings extending therefrom, each side wing being provided with transverse partitions, and a conveyer screw mounted to rotate in the curved bottom of the pan, substantially as shown and described.

3. In an ore concentrator, the combination with a rocking pan, of a pivoted sieve above the upper end of the pan, and means for imparting a sudden jerk or shake to the sieve, substantially as described.

4. In an ore concentrator, the combination with a rocking pan, of a sieve pivoted in the pan at the upper end thereof, and means for imparting a sudden jerk or shake to the sieve as the pan is rocked, substantially as described.

5. In an ore concentrator, the combination with a rocking pan, of a sieve pivoted in the pan, and a counter-balance carried by the sieve, substantially as and for the purpose set forth.

6. In an ore concentrator, the combination with a rocking pan, and a screw conveyer in the bottom of the pan, of a sieve pivoted in the pan at the upper end thereof, and means for imparting a sudden jerk or shake to the sieve as the pan is rocked, substantially as described.

7. In an ore concentrator, the combination with a rocking pan having wings provided with partitions, and a conveyer screw in the bottom of the pan, of a pivoted sieve at the upper end of the pan, means for imparting a sudden jerk or shake to the sieve as the pan is rocked, and a water distributing device above the pan, substantially as described.

8. In an ore concentrator, the combination with a feed hopper, of a stirrer in the hopper, a rocking pan, a conveyer screw in the bottom of the pan, an oscillating sieve in the pan below the hopper, and a water distributing device above the pan, substantially as described.

9. In an ore concentrator, the combination with a rocking pan, of a water trough supported above the pan, and means for imparting a transverse swinging motion to the trough as the pan is rocked, substantially as described.

10. In an ore concentrator, the combination with a rocking pan, of an oscillating sieve at the upper end of the pan and adapted to strike one side of the pan as the said pan is rocked, a water trough supported above the pan and means for imparting a transverse swinging motion to the trough when the pan is pivoted, whereby when the sieve strikes one side of the pan, the trough will be at the opposite side, substantially as described.

11. An ore concentrator provided with a rocking pan having side wings provided with partitions, and a rocking water trough adapted to discharge alternately on the said side wings, substantially as shown and described.

12. An ore concentrator comprising a rocking pan having a curved bottom and side wings provided with transverse partitions, a conveyer screw mounted to turn in the curved bottom of the said pan, and an oscillating clear water trough for alternately discharging jets of water on the said side wings, substantially as shown and described.

13. An ore concentrator comprising a rocking pan having a curved bottom and side wings provided with transverse partitions, a conveyer screw mounted to turn in the curved bottom of the said pan, an oscillating clear water trough for alternately discharging jets of water on the said side wings, and means, substantially as described, for imparting a rocking motion to the said trough from the said pan, as set forth.

WILLIAM HENRY MOORE.

Witnesses:
  W. H. RICHARDS,
  HERBERT A. CABLE.